United States Patent [19]
Topolkaraev et al.

[11] Patent Number: 6,117,438
[45] Date of Patent: Sep. 12, 2000

[54] WATER DEGRADABLE MICROLAYER POLYMER FILM AND ARTICLES INCLUDING SAME

[75] Inventors: Vasily Topolkaraev, Appleton; Dave A. Soerens, Neenah, both of Wis.; Kelly Dean Branham, Lawrenceville, Ga.

[73] Assignee: Kimberly-Clark Worldwide, Inc., Neenah, Wis.

[21] Appl. No.: 09/001,730

[22] Filed: Dec. 31, 1997

[51] Int. Cl.$^7$ ...................................................... A61K 9/00
[52] U.S. Cl. ........................... 424/404; 424/400; 424/443
[58] Field of Search .................................. 424/400, 404, 424/443; 425/131.1, 133.5, 462; 428/412, 475.8, 476.1, 516, 517, 518, 520, 35.4; 156/244.11; 264/171, 211; 514/772

[56] References Cited

U.S. PATENT DOCUMENTS

| | | | |
|---|---|---|---|
| 3,051,453 | 8/1962 | Sluijters | 259/4 |
| 3,576,707 | 4/1971 | Schrenk et al. | 161/164 |
| 4,873,037 | 10/1989 | Chau et al. | 264/49 |
| 4,874,568 | 10/1989 | Chau et al. | 264/49 |
| 5,269,995 | 12/1993 | Ramanathan et al. | 264/171 |

OTHER PUBLICATIONS

Mueller et al., *Novel Structures by Microlayer Coextrusion—Talc-Filled PP, PC/SAN, and HDPE/LLDPE*, Polymer Engineering and Science, Feb. 1997, vol. 37, No. 2, pp. 355–362.

Schrenk et al., *Coextruded Multilayer Polymer Films and Sheets*, Polymer Blends, vol. 2, pp. 129–165.

Im et al., *Coextruded Microlayer Film and Sheet*, Journal of Plastic Film & Sheeting, Apr. 1988, vol. 4, pp. 104–115.

*Primary Examiner*—Jose' G. Dees
*Assistant Examiner*—Kathryne E. Shelborne
*Attorney, Agent, or Firm*—Jones & Askew, LLP

[57] ABSTRACT

A microlayer polymer film comprising a plurality of coextruded microlayers including a non-degradable layer comprising a non-water degradable, melt-extrudable polymer and degradable layer comprising a water degradable, melt-extrudable polymer. The microlayer polymer film degrades when soaked in water and is suitable as a covering material for disposal items such as flushable diapers. The microlayer polymer film is also breathable and is a barrier to small amounts of water. A suitable non-water degradable, melt-extrudable polymer is linear low density polyethylene filled with a particulate filler. A suitable water degradable, melt-extrudable polymer is polyethylene oxide.

41 Claims, 3 Drawing Sheets

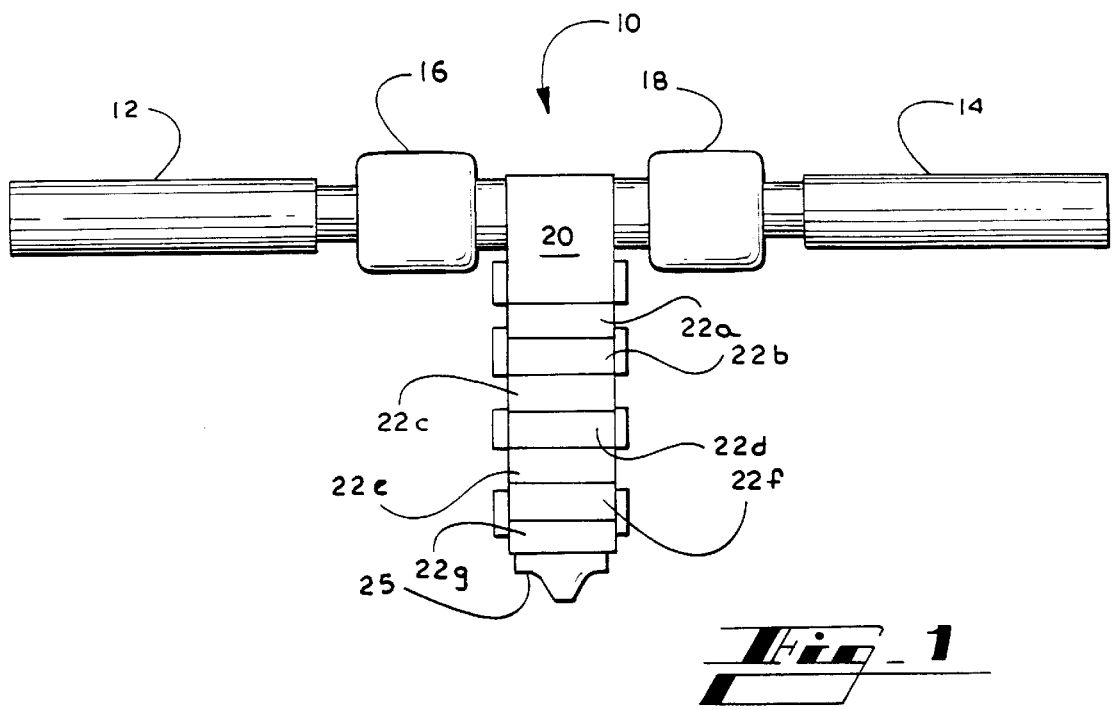
Fig_1
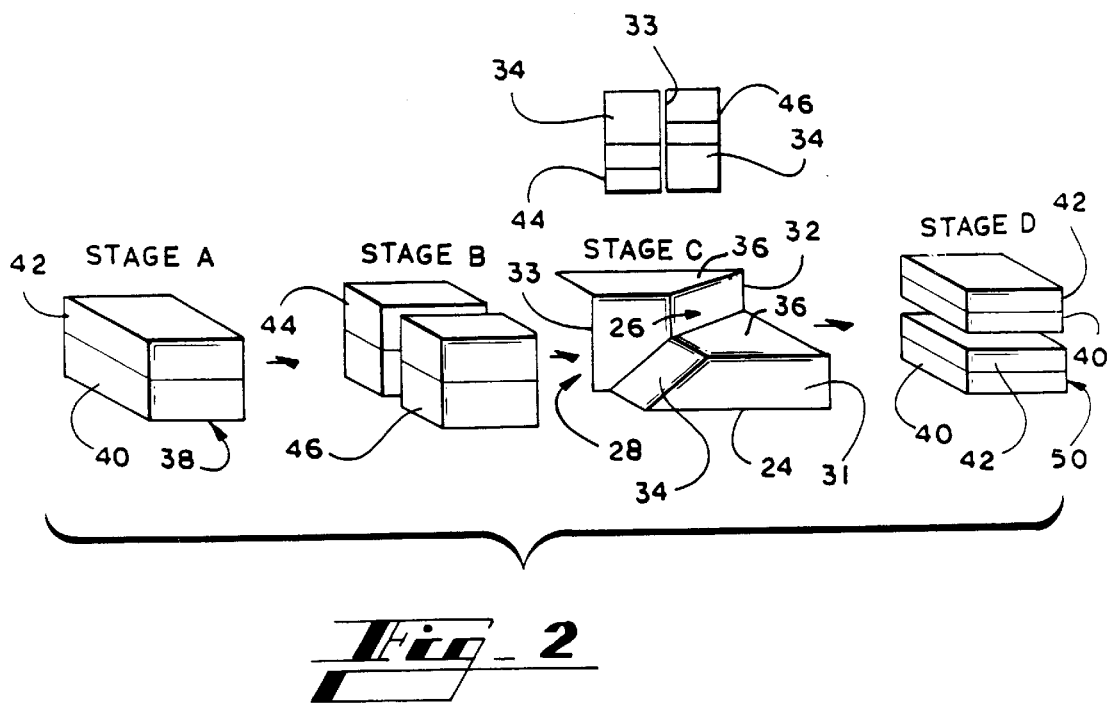
Fig_2

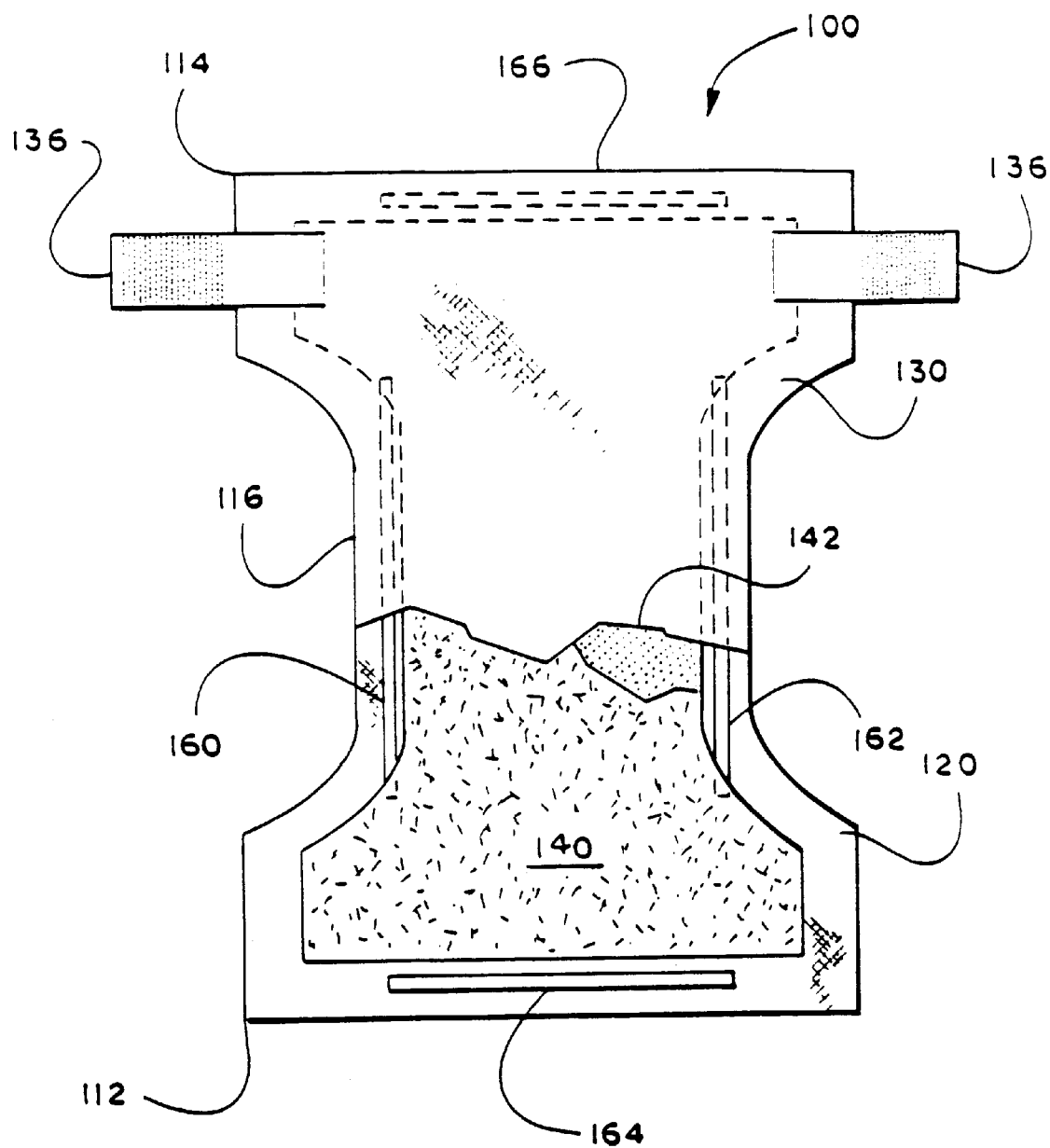
Fig_3

WATER DEGRADABLE MICROLAYER POLYMER FILM AND ARTICLES INCLUDING SAME

TECHNICAL FIELD

This invention generally relates to polymer films, and more particularly relates to water degradable polymer films for use in making disposable absorbent products.

BACKGROUND OF THE INVENTION

Polymer films are useful in making a variety of disposable articles because polymer films are relatively inexpensive to manufacture, and can be made to be strong, durable, flexible, soft, and a barrier to aqueous liquids such as water. For example, polymer films are used to make disposal personal care items such as diapers, adult incontinence products, feminine care absorbent products, training pants, and the like. In particular, polymer films are suitable outer covers for personal care items. Polymer films are also useful in making some types of garments and coverings for a variety of articles.

Disposal of used personal care items, garments, and other coverings is a concern. It is normally desirable that such used items be disposed of in a sealed container or immediately taken to a remote waste site because of undesirable odors or unsightliness common in used personal care items and the like. For example, a used infant diaper is desirably quickly disposed and either sealed in a bag or other refuse container or removed to a remote site.

It would be desirable to flush used personal care items and perhaps some types of garments and other coverings down a commode, but for the fact that such items are typically insoluble or non-dispersible in water and result in clogging the commode. Polymer films made with water degradable polymers are possible, but typically do not have the other necessary characteristics such as high strength and durability for use in making personal care items, garments, and other coverings. Accordingly, there is a need for a water degradable polymer film which is also strong and durable.

SUMMARY OF THE INVENTION

This invention satisfies the above-described need by providing a microlayer polymer film comprising a plurality of coextruded microlayers including a non-degradable layer comprising a non-water degradable, melt-extrudable polymer and a degradable layer comprising a water degradable, melt-extrudable polymer. The microlayer film of this invention degrades in water for convenient disposability, but has sufficient strength and breathability for use in applications such as disposable absorbent personal care products, garments, and other covering materials. Accordingly, the microlayer polymer film of this invention and products made with such film can be easily disposed by flushing. The microlayer polymer film of this invention is particularly suitable for making flushable personal care items such as diapers, feminine care products, adult incontinence products, and training pants.

The non-water degradable layer of the film of this invention imparts strength and barrier properties to the film. The microlayer polymer film of this invention desirably has a dry tensile strength of at least about 5 MPa in the machine direction and a hydrostatic burst strength of at least about 1 mbar. The water degradable layer imparts a low wet strength to the film and makes the film water degradable. The wet tensile energy at break of the film is not more than 200 J/cm$^3$ in the machine direction after the microlayer polymer film has been soaked in water for one minute. The microlayer of this invention is also water vapor permeable, desirably having a water vapor transmission rate of at least 300 g/m$^2$/day/mil. Both the non-water degradable and water degradable layers are water vapor permeable. The non-water degradable layer can include a particulate filler material, and preferably a hydrophilic surfactant, to control interaction of the film with liquids, allow access of water and other aqueous liquids into the microlayer laminate structure of the microlayer film, or enhance the water vapor permeability of the non water degradable layer. The water degradable layer can also include a particulate filler material and a hydrophilic surfactant for the same reasons.

Suitable non-water degradable polymers when in the form of a solid state film are nonsoluble and nondispersible in water and have tensile properties which are not substantially affected by water. For example, films made of suitable non-water degradable polymers have a wet tensile strength which is substantially the same as the dry tensile strength of the film. Suitable water degradable polymers when in the form of a solid state film have tensile strength properties which are substantially reduced when such films are soaked in water. Desirably, solid state films made of suitable water degradable polymers dissolve or disperse in water. Suitable water degradable polymers which do not dissolve or disperse in water form films which have a wet tensile strength substantially less than the dry tensile strength of the films.

More particularly, the microlayer polymer film of this invention includes a plurality of non-degradable layers comprising the non-water degradable, melt-extrudable polymer and a plurality of degradable layers comprising the water degradable, melt-extrudable polymer. The plurality of non-degradable layers and plurality of degradable layers are arranged in a series of parallel repeating laminate units, each laminate unit comprising at least one of the degradable layers and at least one of the non-degradable layers.

Generally, the individual microlayers of the film of this invention have a thickness small enough so that the non water degradable layers and the water degradable layers of the microlayer film adhere to one another to form a laminate and do not delaminate despite the incompatibility of the non water degradable and water degradable polymers. Each microlayer in the polymer film of this invention has a thickness from about 10 angstroms to about 150 microns. Desirably, each microlayer has a thickness which does not exceed 50 microns and preferably does not exceed 10 microns. More particularly, each microlayer has a thickness which is not less than 100 angstroms and preferably not less than 500 angstroms. Broadly described, the film of this invention has degradable and non-degradable layers totaling 8 to 17,000 in number, and preferably 60 to 8000 in number. Thinner microlayer films, such as for personal care product covers, have a total of 60 to 4000 degradable and non-degradable microlayers. Preferably, such film has 120 to 1000 degradable and non-degradable microlayers.

Suitable non-water degradable polymers for use in this invention include water insoluble and non-water dispersible polymers such as polyolefins. Linear low density polyethylene is a particularly preferred non-water degradable polymer. Suitable water degradable polymers are soluble or dispersible in water. Polyethylene oxide (PEO) is a preferred water degradable polymer.

According to a particular embodiment of the present invention, each laminate unit of the microlayer film can include a tie layer positioned between the non-water degradable layer and the water degradable layer for modifying or enhancing properties of the microlayer film. The tie layer can be formed from a variety of polymers. Suitable polymers are chosen depending on the desired properties of the microlayer film. For example, the tie layer polymer can be selected to have an affinity to the non water degradable layer or the water degradable layer or both for improving adhesion and interaction between those layers. The tie layer polymer can also be selected to enhance other properties of the microlayer film such as toughness and barrier. According to a particular embodiment, the microlayer polymer film has a non-water degradable layer of LLDPE, a tie layer of polycaprolactone, and a water degradable layer of PEO.

According to another aspect of this invention, a method for making a microlayer polymer film is provided. This method includes coextruding a non-water degradable, melt-extrudable polymer and a water degradable, melt-extrudable polymer to form a laminate comprising a non-degradable layer including the non-water degradable, melt-extrudable polymer and a degradable layer including a water degradable, melt-extrudable polymer. The method further includes separating the laminate while the laminate is in a melt-extrudable state to form a pair of laminate halves each including a portion of the non-degradable layer and a portion of the degradable layer. After separation, the laminate halves are thinned and widened and then stacked on top of one another to reform the laminate so that the laminate comprises a plurality of repeating laminate units in parallel stacking arrangement. Each laminate unit comprises a non-degradable layer including the non-water degradable, melt-extrudable polymer and a degradable layer including the water degradable, melt-extrudable polymer. The steps of separating, thinning and widening, and stacking are repeated to form the laminate into the microlayer polymer film. The resulting microlayer film can also be stretched axially and thinned to reduce the basis weight of the microlayer film, enhance access of water and other aqueous liquids into the laminate structure of the microlayer film, enhance disintegration of the microlayer film in water, and enhance the water vapor transport or breathability of the film.

Therefore, an object of this invention is to provide a film which is strong, breathable, and degradable in water, but is a barrier to small amounts of water and other aqueous liquids.

Another object of this invention is to provide a method for making the foregoing film.

Yet another object of this invention is to provide a cover material for flushable, disposable absorbent personal care products, garments, and other coverings.

Other objects, features, and advantages of the present invention will be appreciated from the following detailed description, drawings, and claims.

BRIEF DESCRIPTION OF DRAWINGS

FIG. 1 is a plan view of a coextrusion system for making a microlayer polymer film in accordance with an embodiment of this invention.

FIG. 2 is a schematic diagram illustrating a multiplying die element and the multiplying process used in the coextrusion system illustrated in FIG. 1.

FIG. 3 is a partial plan view of a diaper made according to an embodiment of the present invention.

DETAILED DESCRIPTION OF DRAWINGS

Figure 4:
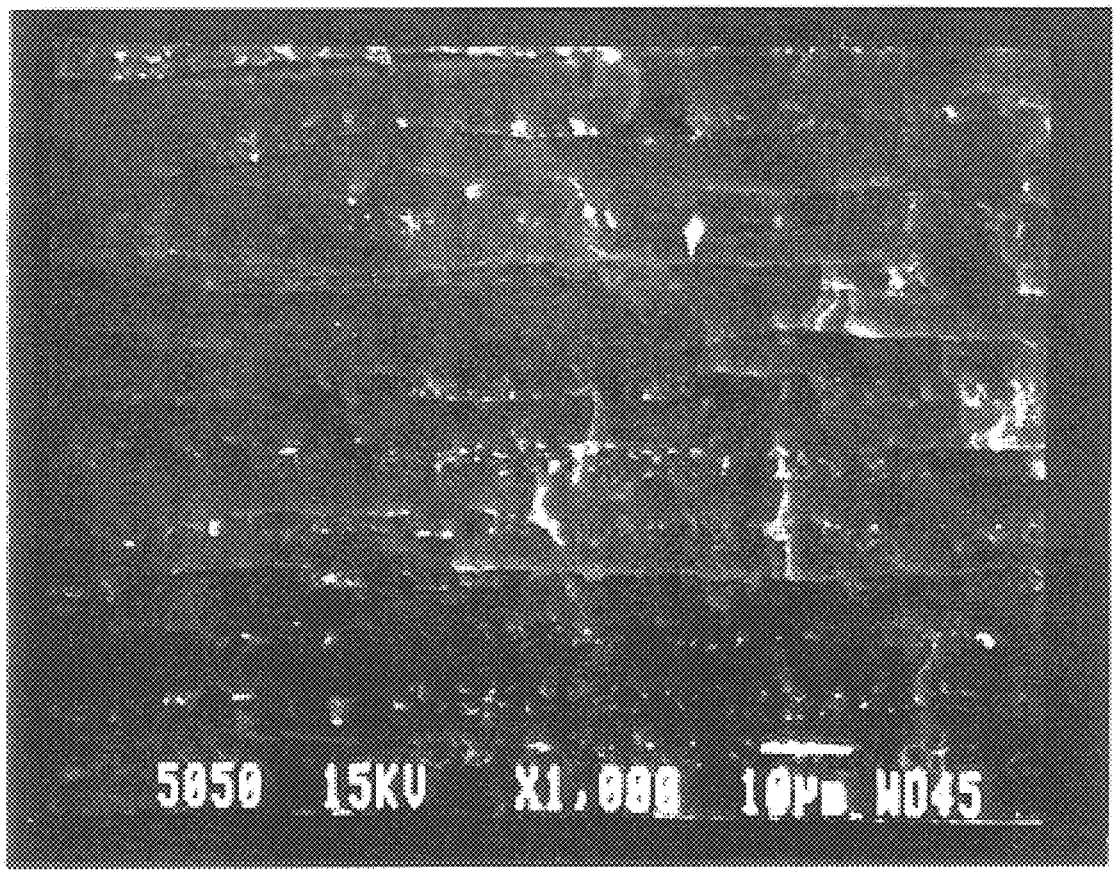
FIG. 4 is a cross sectional SEM photomicrograph of a microlayer polymer film made in accordance with an embodiment of this invention.

As summarized above, this invention encompasses a microlayer polymer film which degrades in water for disposability, but has sufficient strength and breathability for use in applications such as absorbent personal care product covers and water absorbent films. Below is a detailed description of embodiments of this invention including a method for coextruding the microlayer polymer film, followed by a description of uses and properties of the film and particular examples of the film.

The microlayer polymer film of this invention comprises a plurality of coextruded microlayers which form a laminate structure. The coextruded microlayers include a plurality of non-degradable layers comprising a non-water degradable, melt-extrudable polymer and a plurality of degradable layers comprising a water degradable melt-extrudable polymer. The plurality of non-degradable layers and plurality of degradable layers are arranged in a series of parallel repeating laminate units. Each laminate unit comprises at least one of the degradable layers and at least one of the non-degradable layers. Desirably, each laminate unit has one degradable layer laminated to a non-degradable layer so that the coextruded microlayers alternate between degradable and non-degradable layers. Alternatively, each laminate unit can also include a tie or transition layer between the degradable layer and the non-degradable layer. The tie layer is useful for modifying or enhancing properties of the microlayer film.

FIG. 4 is a cross sectional SEM photomicrograph of a microlayer polymer film made in accordance with an embodiment of this invention and illustrates the configuration of alternating layers. The water degradable layers are made of PEO and are smooth in the photomicrograph. The non water degradable layers are made of LLDPE filled with surfactant-modified calcium carbonate and have a rough texture in the photomicrograph. The film in FIG. 4 has 256 microlayers alternating between microlayers of PEO and LLDPE. Although the layers of the film illustrated in FIG. 4 are continuous, it should be understood that films with discontinuous microlayers are also encompassed by this invention. Having discontinuity in the water degradable layer or the non water degradable layer, or both, may be desirable, for example, to enhance adhesion between the layers.

Generally, the individual microlayers of the film of this invention have a thickness small enough so that the non water degradable layers and the water degradable layers of the microlayer film adhere to one another to form a laminate and do not delaminate despite the incompatibility of the non water degradable and water degradable polymers. Each microlayer in the polymer film of this invention has a thickness from about 10 angstroms to about 150 microns. Desirably, each microlayer has a thickness which does not exceed 50 microns and preferably does not exceed 10 microns. More particularly, each microlayer has a thickness which is at least 100 angstroms and preferably at least 500 angstroms. Preferably, the microlayers of the film have a thickness from about 500 angstroms to about 10 microns. Thicker layers of water degradable and non-water degradable polymers do not laminate very well and tend to delaminate after coextrusion. Microlayers, however, form laminate films with high integrity and strength because they do not delaminate after microlayer coextrusion. Microlayers enable combination of 2 or more layers of normally incompatible polymers into a monolithic film with a strong coupling between individual layers without using compatibilizing agents. The term monolithic film here means a film which has multiple layers which adhere to one another and function as a single unit.

The number of microlayers in the film of this invention vary broadly from about 8 to 17,000 in number, and preferably from about 60 to 8000 in number. A suitable cover material for personal care items desirably has from about 60 to about 4000 microlayers and preferably from about 120 to about 1000 microlayers. Thicker films, useful for items such as electroconductive tapes and water or body fluid absorbing tapes, have from about 4000 to about 17,000 microlayers. Generally, the overall thickness of the microlayer polymer film ranges from about 5 microns to about 1 millimeter. Desirably, the overall thickness of the microlayer polymer film ranges from about 10 microns to about 0.5 millimeters, and preferably ranges from about 25 microns to about 0.3 millimeters. Cover materials for personal care items desirably have a thickness from about 10 microns to about 125 microns and preferably have a thickness from about 25 microns to about 75 microns.

The degradable microlayers of the film of this invention desirably consist essentially of a water degradable, melt-extrudable polymer. The water degradable polymer must be melt-extrudable so that the polymer can be coextruded along with the non-water degradable polymer to form the microlayer film. In addition, the water degradable polymer is preferably permeable to water vapor or breathable when in the form of a film and is typically hydrophilic. Suitable water degradable polymers are characterized by being soluble or dispersible in water or swellable in water, or by having tensile properties, such as tensile strength and modulus, which drop substantially when the polymer, in the form of a film, is wetted with water. When dry, however, the water degradable polymer holds shape and has integrity as a film. Preferred water-degradable polymers include water soluble and water dispersible polymers which disintegrate in water. Desirably, the water degradable polymers disintegrate in water in less than about 1 minute. Suitable water degradable polymers include polyethylene oxide (PEO), copolymers of polyethylene oxide and polypropylene oxide, other water dispersible ethylene oxide copolymers, water dispersible blends of polyethylene oxide, water degradable grades of polyvinyl alcohol, blends of polyvinyl alcohol, polyethyloxazoline, water degradable branched polyesters and copolyesters, water dispersible polyurethanes, water degradable acrylic acid based copolymers, water dispersible polyvinyl methyl ether, cellulose derivatives such as methyl cellulose, hydroxypropyl cellulose, methylated hydroxypropyl cellulose, hydroxypropyl methyl cellulose, and the like.

The preferred water-degradable polymer for making the water degradable microlayer polymer film is PEO. Grafted or chemically modified PEO is also suitable. PEO resins having molecular weights ranging from about 100,000 to 8,000,000 are useful. High molecular weight PEO resins are desirable for enhanced liquid stability, mechanical strength and ductility, while low molecular weight PEO resins provide better melt flow and film forming properties. Examples of particularly suitable PEO resins utilized in this invention include the following: (1) WSR N-80, molecular weight equal 200,000, (2) WSR N-750, molecular weight equal 300,000, (3) WSR N-3000, molecular weight equal 400,000, and (4) WSR K12, molecular weight equal 1,000,000, all supplied by Union Carbide in a powder form and pelletized at Planet Polymer Technologies of San Diego, Calif. Other suitable commercially available water degradable polymers include ECOMATY AX-2000 polyvinyl alcohol available from Nippon Gohsei having offices in New York, N.Y. and Eastman AQ branched polyesters and copolyesters.

The water degradable microlayers may also include processing additives and solid-state performance modifiers blended with the water degradable polymer in amounts from about 0.05 up to 30 parts of additive to 100 parts of polymer resin. Suitable additives include a wide variety of materials such as water, polymer emulsions, surfactants, mineral acids, halogens, urea, polyureas, gelatin, metal halides, metal salts, phenols, phenolic resins, polymeric acids, benzoic acid derivatives, glycol derivatives, phosphoric acid derivatives and sorbitan derivatives. The various additives can have a plasticizing affect, improve melt flow characteristics, improve strength and toughness, improve modulus, modify crystalline structure, control release properties, and modify electrochemical behavior. Examples of suitable additives include polyoxyethylene sorbitan monolaurate, Tween 20, ethoxylated nonyl phenol, Tergitol NP-13 and diethylene glycol dibenzoate. Antioxidants can also be added to improve oxidative stability.

The non-water degradable layer of the microlayer film of this invention desirably consists essentially of a non-water degradable, melt-extrudable polymer which makes strong, ductile, tough films for reinforcing the microlayer film of this invention. The non-water degradable layer provides strength, barrier, and durability properties which the water degradable polymer lacks. The non-water degradable layer is a barrier to small amounts of water and other aqueous liquids such as body fluids. Furthermore, the non-water degradable layer is desirably permeable to water vapor (breathable) when in the form of a very thin microlayer, but does not degrade in water. Accordingly, a film made of the non-water degradable polymer is insoluble in water, does not disperse in water, and has tensile properties which do not decline substantially after the film has been soaked in water. In other words, the tensile properties of a film made of the non-water degradable polymer are substantially the same when the film has been soaked in water as when the film is dry.

The term melt-extrudable polymer as used herein means a thermoplastic material having a melt flow rate (MFR) value of not less than about 0.2 grams/10 minutes, based on ASTM D1238. More particularly, the MFR value of suitable melt-extrudable polymers ranges from about 0.2 g/10 minutes to about 100 g/10 minutes. Desirably, the MFR value of suitable melt-extrudable polymers ranges from about 0.4 g/10 minutes to about 50 g/10 minutes, and preferably, ranges from about 0.8 g/10 minutes to about 20 g/10 minutes to provide desired levels of processability.

Still more particularly, suitable melt-extrudable thermoplastic polymers for use in this invention are stretchable in solid state to allow a stretch processing of the microlayered film. The ratio of true tensile fracture stress (tensile force at failure divided by the cross-sectional area of the failed specimen), and the stress at yielding, is useful to determine the stretchability of the polymer film. Desirably, such ratio for suitable melt-extrudable polymers used in this invention ranges from about 1 to about 150, more desirably from about 5 to about 100, and preferably from about 10 to about 50.

Generally, suitable melt-extrudable, non-water degradable polymers for use in this invention include thermoplastic polymers, copolymers, and mixtures thereof. Particularly suitable non-water degradable polymers include polyolefins such as homopolymers of polyethylene or polypropylene, copolymers of ethylene and propylene, polyethers, copolyethers, polyamides, copolyamides, polyester, copolyester, polyurethane, and copolymers and mixtures thereof.

Particularly suitable melt-extrudable, non-water degradable polymers for use in this invention include copolymers of ethylene and $C_4$–$C_8$ alpha-olefin monomer such as super-octene resins. The super-octene resins include linear low density polyethylene (LLDPE) resins which are produced by the polymerization of ethylene and 1-octene comonomer. DOWLEX® Next Generation (NG) resins available from Dow Chemical Corporation of Midland, Michigan are suitable LLDPE resins. The super-octene resins are made with a catalyst system other than metallocene or Insite®. Particularly suitable super octene resins useful in the present invention include, for example, DOWLEX NG 3347A LLDPE resin which contains about 7% octene (nominal weight percent) and 93% ethylene. Other resins suitable for this invention include DOWLEX NG 3310 or other polyethylene homopolymers, copolymers, and their blends. Still other suitable non-water degradable polymers include, for example, random copolymers such as those containing propylene and ethylene. In particular, Union Carbide 6D81 and 6D82 random copolymers containing 5.5% ethylene are suitable and are available from Union Carbide Corporation. Polypropylene homopolymers, copolymers, and their blends as well as thermoplastic polyesters, such as polycaprolactone resin are suitable non-water degradable polymers for use in this invention. TONE 787 polycaprolactone resin available from Union Carbide is particularly desirable as explained herein below in more detail.

The non-water degradable layer of the microlayer film of this invention may also include processing additives and solid state modifiers in amounts from about 0.05 to about 5 parts of additive to 100 parts of resin. Such additives may include calcium stearate or other acid scavengers, organo silicone compounds, silicone glycol copolymers, olefinic elastomers, and low molecular weight paraffins or lubricating additives and surfactants. The various additives can have a plasticizing effect, improve the strength and softness of the film, improve interaction with fluids and help facilitate the extrusion, film casting, stretch processing, and interaction with fluids. Again, antioxidants can also be added to improve oxidative stability.

Both the water degradable and non water degradable layers can include a supplemental material such as a filler material, a surfactant, or other surface active material. The filler material can be a particulate filler material to enhance water vapor permeability of the film. Particulate filler material creates discontinuity in the layer to provide pathways for water vapor to move through the film. Particulate filler material can also enhance the ability of the microlayer film to absorb or immobilize fluid, enhance degradation of the microlayer film in water, provide porosityinitiating debonding sites to enhance the formation of pores when the microlayer film is stretched and reduce production cost of the microlayer film. In addition, lubricating and release agents can facilitate the formation of microvoids and the development of a porous structure in the film during stretching of the film and can reduce adhesion and friction at filler-resin interface. Surface active materials such as surfactants coated on the filler material can reduce the surface energy of the film, increase hydrophilicity of the film, reduce film stickiness, provide lubrication, or reduce the coefficient of friction of the film.

Suitable filler materials can be organic or inorganic, and are desirably in a form of individual, discreet particles. Suitable inorganic filler materials include metal oxides, metal hydroxides, metal carbonates, metal sulfates, various kinds of clay, silica, alumina, powdered metals, glass microspheres, or vugular void-containing particles. Particularly suitable filler materials include calcium carbonate, barium sulfate, sodium carbonate, magnesium carbonate, magnesium sulfate, barium carbonate, kaolin, carbon, calcium oxide, magnesium oxide, aluminum hydroxide, and titanium dioxide. Still other inorganic fillers can include those with particles having higher aspect ratios such as talc, mica and wollastonite. Suitable organic filler materials include, for example, latex particles, particles of thermoplastic elastomers, pulp powders, wood powders, cellulose derivatives, chitin, chitozan powder, powders of highly crystalline, high melting polymers, beads of highly crosslinked polymers, organosilicone powders, and powders of super absorbent polymers, such as polyacrylic acid, and the like, as well as combinations and derivatives thereof. These filler materials can improve toughness, softness, opacity, vapor transport rate (breathability), water dispersability, biodegradability, fluid immobilization and absorption, skin wellness, and other beneficial attributes of the microlayer film.

The particulate filler material is suitably present in the non-water degradable layer in an amount from about 30 to about 80% by weight of the layer and has an average particle size ranging from about 0.1 to about 50 microns. More particularly, the filler material is present in the non-water degradable layer in an amount not more than about 65% by weight of the layer and the average particle size does not exceed about 20 microns. The particulate filler material is suitably present in the microlayer film in an amount from about 0.5 to about 70% by weight of the film. Desirably, the average particle size of the filler material does not exceed about 10 microns, more desirably does not exceed 8 microns, even more desirably does not exceed about 5 microns, and preferably does not exceed about 1 micron.

Suitable commercially available filler materials include the following:

1. SUPERMITE, an ultrafine ground $CaCO_3$, which is available from ECC International of Atlanta, Georgia. This material has a top cut particle size of about 8 microns and a mean particle size of about 1 micron and can be coated with a surfactant, such as Dow Corning 193 surfactant, before mixing with the non-water degradable polymer.

2. SUPERCOAT, a coated ultrafine ground $CaCO_3$, which is available from ECC International of Atlanta, Ga. This material has a top cut particle size of about 8 microns and a mean particle size of about 1 micron.

3. OMYACARB UF, high purity, ultrafine, wet ground $CaCO_3$, which is available from OMYA, Inc., of Proctor, Vt. This material has a top cut particle size of about 4 microns and an average particle size of about 0.7 microns and provides good processability. This filler can also be coated with a surfactant such as Dow Corning 193 surfactant before mixing with the non water degradable polymer.

4. OMYACARB UFT $CaCO_3$, an ultrafine pigment surface coated with stearic acid, available from OMYA, Inc. This material has a top cut particle size of about 4 microns and a mean particle size of about 0.7 microns and provides good processability.

Surfactants increase the hydrophilicity of the film and enhance the water vapor permeability of the film. For example, the surface active material may be blended or otherwise incorporated onto the particulate filler material before the filler material is mixed with the non-water degradable polymer. Suitable surface active materials have a hydrophile-lipophile balance (HLB) number from about 6 to about 18. Desirably, the HLB number of the surface active material ranges from about 8 to about 16, and more desirably ranges from about 12 to about 15. When the HLB number is too low, the wettability can be insufficient and when the HLB number is too high, the surface active material may have insufficient adhesion to the polymer matrix of the non-water degradable layer, and may be too easily washed away during use. A number of commercially available surfactants can be found in McMcutcheon's Vol. 2; *Functional Materials*, 1995.

Suitable surfactants for treating the particulate filler material include silicone glycol copolymers, ethylene glycol oligomers, acrylic acid, hydrogen-bonded complexes, carboxilated alcohol, ethoxylates, various ethoxylated alcohols, ethoxylated alkyl phenols, ethoxylated fatty esters, and the like, as well as combinations thereof. Suitable commercially available surfactants include the following:

1. Surfactants composed of ethoxylated alkyl phenols, such as IGEPAL RC-620, RC-630, CA-620, 630, 720, CO-530, 610, 630, 660, 710, and 730, which are available from Rhone-Poulenc, Inc. of Cranbury, N.J.

2. Surfactants composed of silicone glycol copolymers, such as Dow Corning D190, D193, FF400, and D1315, available from Dow Corning of Midland, Mich.

3. Surfactants composed of ethoxylated mono and diglycerides, such as Mazel 80 MGK, masil SF 19, and Mazel 165 C, available from PPG Industries of Gurneen, Ill.

4. Surfactants composed of ethoxylated alcohols, such as Genapol 26-L-98N, Genapol 26-L60N, and Genapol 26-L-5 which are available from Hoechst Celanese Corporation of Charlotte, N.C.

5. Surfactants composed of carboxilated alcohol ethoxylates, such as Marlowet 4700 and Marlowet 4703, which are available from Huls America, Inc. of Piscataway, N.J.

6. Ethoxylated fatty esters, such as Pationic 138C, Pationic 122A, Pationic SSL, which are available from R.I.T.A. Corporation of Woodstock, Ill.

The surface active material is suitably present in the non-water degradable layer in an amount from about 0.5 to about 20% by weight of the non-water degradable layer. Desirably, the surface active material is present in the non-water degradable layer in an amount from about 1 to about 15% by weight of the layer, and more desirably in an amount from about 2 to about 10% by weight of the layer. The surface activate material is suitably present on the particulate filler material in an amount from about 3 to about 12% by weight of the filler material. Desirably, the surface active material is present on the particulate filler material in an amount from about 4 to about 10% by weight of the filler material and more desirably from about 6 to about 10% by weight of the filler material.

In the microlayer of this invention, the non-water degradable layer desirably constitutes 3 to 95% by weight of the microlayer film. Accordingly, the water degradable layer desirably constitutes from 97 to 5% by weight of the microlayer of film. More desirably, the non-water degradable layers constitute 5 to 90% by weight of the microlayer film and the water degradable layers constitute from 95 to 10% by weight of the microlayer of film. Still more desirably, the non-water degradable layers constitute 10 to 70% by weight of the microlayer film and the water degradable layers constitute 90 to 30% by weight of the microlayer film.

The tie or transition layer described in the alternative embodiment above can be formed from a variety of melt extrudable polymers. Suitable polymers are chosen depending on the desired properties of the microlayer film. For example, the tie layer polymer can be selected to have an affinity to the non water degradable layer or the water degradable layer or both for improving adhesion and interaction between those layers. The tie layer polymer can also be selected to enhance other properties of the microlayer film such as toughness and barrier and can enhance the disintegration of the microlayer film in water. Suitable polymers for the tie layer depend on the particular polymers used for the water degradable layer and the non-water degradable layer, but generally include ethylene acrylic acid copolymers, thermoplastic polyesters, polyalkane-poly (ethylene oxide) block copolymers, poly(vinyl alcohol) block copolymers, and the like. Desirably, the tie layer constitutes from about 0.5 to about 20% by weight of the microlayer film. More desirably, the tie layer constitutes from about 1.5 to about 15% by weight of the microlayer film and even more desirably constitutes from about 3 to about 10% by weight of the microlayer of film.

A suitable method for making the microlayer film of this invention is a microlayer coextrusion process wherein two or more polymers are coextruded to form a laminate with two or more layers, which laminate is then manipulated to multiply the number of layers in the film. FIG. 1 illustrates a coextrusion device 10 for forming microlayer films. This device includes a pair of opposed screw extruders 12 and 14 connected through respective metering pumps 16 and 18 to a coextrusion block 20. A plurality of multiplying elements 22a–g extend in series from the coextrusion block perpendicularly to the screw extruders 12 and 14. Each of the multiplying elements includes a die element 24 disposed in the melt flow passageway of the coextrusion device. The last multiplying element 22g is attached to a discharge nozzle 25 through which the final product extrudes.

A schematic diagram of the coextrusion process carried out by the coextrusion device 10 is illustrated in FIG. 2. FIG. 2 also illustrates the structure of the die element 24 disposed in each of the multiplying elements 22a–g. Each die element 24 divides the melt flow passage into two passages 26 and 28 with adjacent blocks 31 and 32 separated by a dividing wall 33. Each of the blocks 31 and 32 includes a ramp 34 and an expansion platform 36. The ramps 34 of the respective die element blocks 31 and 32 slope from opposite sides of the melt flow passage toward the center of the melt flow passage. The expansion platforms 36 extend from the ramps 34 on top of one another.

To make a water degradable microlayer film using the coextrusion device 10 illustrated in FIG. 1, a non-water degradable polymer such as LLDPE is extruded through the first single screw extruder 12 into the coextrusion block 20. Likewise, a water degradable polymer such as PEO is extruded through the second single screw extruder 14 into the same coextrusion block 20. In the coextrusion block 20, a two-layer melt laminate structure 38 such as that illustrated at stage A in FIG. 2 is formed with the water degradable PEO forming a layer on top of a layer of non-water degradable LLDPE. The melt laminate is then extruded through the series of multiplying elements 22a–g to form a 256 layer microlaminate with the layers alternating between PEO and LLDPE. As the two-layer melt laminate is extruded through the first multiplying element 22a, the dividing wall 33 of the die element 24 splits the melt laminate 38 into two halves 44 and 46 each having a layer of PEO 40 and a layer of LLDPE 42. This is illustrated at stage B in FIG. 2. As the melt laminate 38 is split, each of the halves 44 and 46 are forced along the respective ramps 34 and out of the die element 24 along the respective expansion platforms 36. This reconfiguration of the melt laminate is illustrated at stage C in FIG. 2. When the melt laminate 38 exits from the die element 24, the expansion platform 36 positions the split halves 44 and 46 on top of one another to form a four-layer melt laminate 50 having, in parallel stacking arrangement, an LLDPE layer, a PEO layer, an LLDPE layer and a PEO layer in laminate form. This process is repeated as the melt laminate proceeds through each of the multiplying elements 22b–g. When the melt laminate is discharged through the discharge nozzle 25, the melt laminate forms a film having 256 layers.

The foregoing microlayer coextrusion device and process is described in more detail in an article Mueller et al., entitled *Novel Structures By Microlayer Extrusion-Talc-Filled PP, PC/SAN, and HDPE-LLDPE*. A similar process is described in U.S. Pat. No. 3,576,707 and U.S. Pat. No. 3,051,453, the disclosures of which are expressly incorporated herein by reference.

The relative thickness of the water degradable and non-water degradable layers of the film made by the foregoing process can be controlled by varying the feed ratio of the polymers into the extruders, thus controlling the constituent volume fraction. In addition, one or more extruders can be added to the coextrusion device to increase the number of different polymers in the microlayer film. For example, a third extruder can be added to add a tie layer to the film.

The water degradable microlayer film may be subjected to a selected plurality of stretching operations, such as uniaxial stretching operation or biaxial stretching operation. Stretching operations can provide microporous microlayer film with a distinctive porous microlayered morphology, can enhance water vapor transport through the film, and can improve water access, and enhance water degradability of the film.

The microlayer film of the invention can be pretreated to prepare the film for the subsequent stretching operations. The pretreatment can be done by annealing the film at elevated temperatures, by spraying the film with a surface-active fluid (such as a liquid or vapor from the surface-active material employed to surface-modify the filler material), by modifying the physical state of the microlayer film with ultraviolet radiation treatment, an ultrasonic treatment, or a high-energy radiation treatment. In addition, the pretreatment of the microlayer film may incorporate a selected combination of two or more of the foregoing techniques. The following examples 1–16 and 19–23 are designed to illustrate particular embodiments of this invention and teach one of ordinary skill in the art how to carryout the invention. Examples 17, 18 and 24 are comparative examples.

EXAMPLE 1

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics by using a Farrel high shear mixer (Heritage Plastics Inc.), and the filled resin was pelletized. The $CaCO_3$ mean particle size was about 1 micron, and the concentration of $CaCO_3$ was 43.4 wt % (based on the total weight of the resin, filler, and surfactant) as measured by the ashes analysis. The DOW CORNING 193 silicone glycol surfactant had a HLB number of 12.2. The surfactant modified filled LLDPE resin was dried for 14 hours using vacuum oven set at 80° C. before microlayer coextrusion. POLYOX® WSR N-3000 (PEO) resin in powder form (Union Carbide Corporation) was blended with 12 wt % of plasticizer, Tween 20, using a twin screw extruder, and pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 36 rpm (PEO) and 14 rpm (filled LLDPE). A microlayer film of 256 layers was produced using 7 cutting and spreading die elements and a 6" film die set at 170° C. The cast 256 layer film had a 90/10 PEO/filled LLDPE ratio by volume and a thickness of less than 1 mil.

EXAMPLE 2

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before microlayer coextrusion. POLYOX® WSR N-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruders temperature was set at 170° C. for the filled LLDPE resin and was set at 150° C. for the PEO resin. The feed ratio was controlled by setting corresponding pump speeds at 36 rpm (PEO) and 4 rpm (filled LLDPE). A microlayer film of 1024 layers was produced using 9 cutting and spreading die elements and a 6 inch film die set at 170° C. The cast 1024 layer film had a 90/10, PEO/filled LLDPE ratio by volume and a thickness of about 1 mil.

EXAMPLE 3

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before microlayer coextrusion. POLYOX® WSR N-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 28 rpm (PEO) and 12 rpm (filled LLDPE). A microlayer film of 1024 layers was produced using 9 cutting and spreading die elements and a 6 inch film die. The cast 1024 layer film had a 70/30, PEO/filled LLDPE ratio by volume and a thickness of about 1 mil to 2 mil.

EXAMPLE 4

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in the microlayer coextrusion process. The POLYOX® WSR N-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 28 rpm (PEO) and 12 rpm (filled LLDPE). A microlayer film of 512 layers was produced using 8 cutting and spreading die elements and a 6 inch film die. The cast 512 layer film had a 70/30, PEO/filled LLDPE ratio by volume and a thickness of about 1 mil.

EXAMPLE 5

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in the microlayer coextrusion process. The POLYOX® WSR N-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 28 rpm (PEO) and 12 rpm (filled LLDPE). A microlayer film of 256 layers was produced using 7 cutting and spreading die elements and a 6 inch film die set at 170° C. The cast 256 layer film had 70/30, PEO/filled LLDPE ratio by volume and a thickness of about 1 mil.

EXAMPLE 6

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in the microlayer coextrusion process. The POLYOX® WSR N-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 28 rpm (PEO) and 12 rpm (filled LLDPE). A microlayer film of 16 layers was produced using 3 cutting and spreading die elements and a 6 inch film die. The cast 16 layer film had a 70/30, PEO/filled LLDPE ratio by volume. The film had poor adhesion between the layers and can be delaminated.

EXAMPLE 7

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in the microlayer coextrusion process. The POLYOX® WSR N-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C for the filled LLDPE resin and was set at 150° C. for the PEO resin. The feed ratio was controlled by setting a corresponding pump speeds at 28 rpm (PEO) and 12 rpm (filled LLDPE). A microlayer film of 8 layers was produced using 2 cutting and spreading die elements and a 6 inch film die. The cast 8 layer film had 70/30, PEO/filled LLDPE ratio by volume. The film had a poor adhesion between the layers and can be delaminated.

EXAMPLE 8

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in the microlayer coextrusion process. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 20 rpm and 20 rpm. A microlayer film of 256 layers was produced using 7 cutting and spreading die elements and a 6 inch film die. The cast 256 layer film had a 50/50, PEO/filled LLDPE ratio by volume and a thickness of about 3 mil to 4 mil.

EXAMPLE 9

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in the microlayer coextrusion process. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 20 rpm and 20 rpm. A microlayer film of 512 layers was produced using 8 cutting and spreading die elements and a 6 inch film die. The cast 512 layer film had 50/50, PEO/filled LLDPE ratio by volume and a thickness of about 3 mil to 4 mil.

EXAMPLE 10

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in the microlayer coextrusion process. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 20 rpm and 20 rpm. A microlayer film of 512 layers was produced using 8 cutting and spreading die elements and a 6 inch film die. The cast 512 layer film had 50/50, PEO/filled LLDPE ratio by volume and a thickness of about 2 mil to 3 mil.

EXAMPLE 11

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in a microlayer coextrusion process. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 170° C. for the filled LLDPE resin and was set at 150° C. for the PEO resin. The feed ratio was controlled by setting corresponding pump speeds at 12 rpm (PEO) and 28 rpm (filled LLDPE). A microlayer film of 256 layers was produced using 7 cutting and spreading die elements and a 6 inch film die. The cast 256 layer film had 30/70, PEO/filled LLDPE ratio by volume and a thickness of about 3 mil to 4 mil.

EXAMPLE 12

A $CaCO_3$ particulate filler material (SUPERMITE from ECC International) was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 50 wt % (based on the total weight of the resin, and filler) as measured by the ashes analysis. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and surfactant-modified filled LLDPE resin were fed into extruders of the microlayer coextrusion line. The extruder temperature was set at 190° C. for the filled LLDPE resin and was set at 150° C. for the PEO resin. The feed ratio was controlled by setting corresponding pump speeds at 36 rpm (PEO) and 4 rpm (filled LLDPE). A microlayer film of 256 layers was produced using 7 cutting and spreading die elements and a 6 inch film die set at 190° C. The cast 256 layer film had 90/10, PEO/filled LLDPE ratio by volume and a thickness of about 1 mil.

EXAMPLE 13

A $CaCO_3$ particulate filler material (SUPERMITE from ECC International) was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 50 wt % (based on the total weight of the resin and filler) as measured by the ashes analysis. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and filled LLDPE resin were fed into extruders of the microlayer coextrusion line. The extruder temperature was set at 190° C. for the filled LLDPE resin and was set at 150° C. for the PEO resin. The feed ratio was controlled by setting corresponding pump speeds at 28 rpm (PEO) and 12 rpm (filled LLDPE). A microlayer film of 256 layers was produced using 7 cutting and spreading die elements and a 6 inch film die set at 190° C. The cast 256 layer film had a 70/30, PEO/filled LLDPE ratio by volume and a thickness of about 2 mil.

EXAMPLE 14

A $CaCO_3$ particulate filler material (SUPERMITE from ECC International) was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 50 wt % (based on the total weight of the resin and filler) as measured by the ashes analysis. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and filled LLDPE resin were fed into extruders of the microlayer coextrusion line. The extruder temperature was set at 190° C. for the filled LLDPE resin and was set at 150° C. for the PEO resin. The feed ratio was controlled by setting corresponding pump speeds at 20 rpm (PEO) and 20 rpm (filled LLDPE). A microlayer film of 256 layers was produced using 7 cutting and spreading die elements and a 6 inch film die set at 190° C. The cast 256 layer film had a 50/50, PEO/filled LLDPE ratio by volume and a thickness of about 2 mil to 3 mil.

EXAMPLE 15

A $CaCO_3$ particulate filler material (SUPERMITE from ECC International) was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 50 wt % (based on the total weight of the resin, and filler) as measured by the ashes analysis. The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and filled LLDPE resin were fed into extruders of the microlayer coextrusion line. The extruder temperature was set at 190° C. for the filled LLDPE resin and was set at 150° C. for the PEO resin. The feed ratio was controlled by setting a corresponding pump speeds at 12 rpm (PEO) and 28 rpm (filled LLDPE). A microlayer film of 256 layers was produced using 7 cutting and spreading die elements and a 6 inch film die set at 190° C. The cast 256 layer film had 30/70, PEO/filled LLDPE ratio by volume and a thickness of about 2 mil.

EXAMPLE 16

A $CaCO_3$ particulate filler material (SUPERMITE from ECC International) was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 50 wt % (based on the total weight of the resin, and filler) as measured by the ashes analysis. The POLYOX® WSR-N-12K (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin and filled LLDPE resin were fed into extruders of the microlayer coextrusion line. The extruders temperature was set at 190° C. for the filled LLDPE resin and was set at 150° C. for the PEO resin. The feed ratio was controlled by setting corresponding pump speeds at 20 rpm (PEO) and 20 rpm (filled LLDPE). A microlayer film of 32 layers was produced using 4 cutting and spreading die elements and a 6 inch film die set at 190° C. The cast 32 layer film had 50/50, PEO/filled LLDPE ratio by volume and a film thickness of about 4 mil.

EXAMPLE 17 (Comparative)

The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. The pellets of PEO resin were fed into extruders of the microlayer coextrusion line. The extruders temperature was set at 150° C. for the PEO resin. The feed ratio was controlled by setting a corresponding pumps speed at 40 rpm. A control PEO film was produced using 7 cutting and spreading die elements and a 6 inch film die set at 170° C. The cast PEO film had 100% PEO and a thickness of about 2 mil. The film dissolves in water during a 1 minute soak and demonstrates a lack of barrier property.

EXAMPLE 18 (Comparative)

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a LLDPE resin composed of an ethylene-octene-1 copolymer (Dowlex NG 3347A supplied by Dow Plastics) by using a Farrel high shear mixer (Heritage Plastics Inc.), and the filled resin was pelletized. The $CaCO_3$ mean particle size was about 1 micron, and the concentration of $CaCO_3$ was 43.4% (based on the total weight of the resin, filler, and surfactant) as measured by the ashes analysis. The DOW CORNING 193 silicone glycol surfactant had a HLB number of 12.2. The surfactant-modified filled LLDPE resin was dried for 14 hours using vacuum oven set at 80° C. before using in a microlayer coextrusion process. The pellets of the surfactant-modified filled LLDPE resin were fed into the extruder of the microlayer coextrusion line. The extruder temperature was set at 170° C. The feed ratio was controlled by setting a corresponding pumps speed at 40 rpm. A control filled LLDPE film was produced using 7 cutting and spreading die elements and a 6 inch film die set at 170° C. The cast film was composed of 100% of surfactant-modified filled LLDPE and had a thickness of about 2 mil. The produced control filled LLDPE film was not water responsive and did not change tensile properties after a 1 minute soak in water.

EXAMPLE 19

The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. Pellets of the PEO resin and polycaprolactone (PCL) resin, TONE® P-787 supplied by Union Carbide Corporation, were fed into extruders of the microlayer coextrusion line. The extruder temperature was set at 150° C. for the PCL and was set at 150° C. for the PEO resin. The feed ratio was controlled by setting corresponding pump speeds at 36 rpm (PEO) and 4 rpm (PCL). A microlayer film of 256 layers was produced using 7 cutting and spreading die elements and a 6 inch film die set at 150° C. The cast 256 layer film had a 90/10 PEO/PCL ratio by volume and a thickness of about 1 mil to 2 mil.

EXAMPLE 20

The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. Pellets of the PEO resin and polycaprolactone (PCL) resin, TONE® P-787 supplied by Union Carbide Corporation, were fed into extruders of the microlayer coextrusion line. The extruder temperature was set at 150° C. for the PCL and was set at 150° C. for the PEO resin. The feed ratio was controlled by setting corresponding pump speeds at 28 rpm (PEO) and 12 rpm (PCL). A microlayer film of 256 layers was produced using 7 cutting and spreading die elements and a 6 inch film die set at 150° C. The cast 256 layer film had a 70/30 PEO/PCL ratio by volume and a thickness of about 1 mil to 2 mil.

EXAMPLE 21

The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. Pellets of PEO resin and polycaprolactone (PCL) resin, TONE® P-787 supplied by Union Carbide Corporation, were fed into extruders of the microlayer coextrusion line. The extruder temperature was set at 150° C. for the PCL and was set at 150° C. for the PEO resin. The feed ratio was controlled by setting corresponding pump speeds at 20 rpm (PEO) and 20 rpm (PCL). A microlayer film of 256 layers was produced using 7 cutting and spreading die elements and a 6 inch film die set at 150° C. The cast 256 layer film had 50/50 PEO/PCL ratio by volume and a thickness of about 1 mil to 2 mil.

EXAMPLE 22

The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. Pellets of the PEO resin and polycaprolactone (PCL) resin, TONE® P-787 supplied by Union Carbide Corporation, were fed into extruders of the microlayer coextrusion line. The extruder temperature was set at 150° C. for the PCL and was set at 150° C. for the PEO resin. The feed ratio was controlled by setting corresponding pump speeds at 12 rpm (PEO) and 28 rpm (PCL). A microlayer film of 256 layers was produced using 7 cutting and spreading die elements and a 6 inch film die set at 150° C. The cast 256 layer film had 30/70 PEO/PCL ratio by volume and a thickness of about 2 mil to 3 mil.

EXAMPLE 23

The POLYOX® WSRN-3000 (PEO) resin in powder form (Union Carbide Corporation) was blended with 12 wt % of plasticizer, Tween 20, using a twin screw extruder, and was pelletized using air cooled belt at Planet Polymer Technologies. Pellets of the PEO resin and polycaprolactone (PCL) resin, TONE® P-787 supplied by Union Carbide Corporation, were fed into extruders of the microlayer coextrusion line. The extruder temperature was set at 150° C. for the PCL and was set at 150° C. for the PEO resin. The feed ratio was controlled by setting corresponding pump speeds at 4 rpm (PEO) and 36 rpm (PCL). A microlayer film of 256 layers was produced using 7 cutting and spreading die elements and a 6 inch film die set at 150° C. The cast 256 layer film had 10/90 PEO/PCL ratio by volume and a thickness of about 1 mil to 2 mil.

EXAMPLE 24 (Comparative)

The pellets of polycaprolactone resin, TONE® P-787 supplied by Union Carbide Corporation, were fed into extruders of the microlayer coextrusion line. The extruder temperature was set at 150° C. for the PCL resin. The pump speed was set at 40 rpm. A control PCLL film was produced using 7 cutting and spreading die elements and a 6 inch film die set at 150° C. The cast film was composed of 100% PCL and had a thickness of about 2 mi. The produced control PCL and had a thickness of about 1 mil to 2 mil. The produced control PCL film was not water responsive during a 1 minute soak.

EXAMPLE 25

The same as Example 8, only POLYOX WSR N-80 (PEO) resin was sued to produce this film. The film thickness was about 1 mm.

EXAMPLE 26

The same as Example 5, only POLYOX WSR N-80 (PEO) resin was used to produce this film. The film thickness was about 1 mm.

EXAMPLE 27

The same as Example 1, only POLYOX WSR N-80 (PEO) resin was used to produce this film. The film thickness was about 1 mm.

EXAMPLE 28

The same as Example 13, only POLYOX WSR N-80 (PEO) resin was used to produce this film. The film thickness was about 1 mm.

EXAMPLE 29

The same as Example 26, only pellets of surfactant-modified filled LLDPE resin were dry mixed with the pellets of ethylene acrylic acid copolymer, Primacor 1430, in a ratio of 75 parts of filled LLDPE resin and 25 parts of Primacor 1430 copolymer. Primacor 1430 copolymer was supplied by Dow Chemical Company. The film thickness was about 1 mm.

EXAMPLE 30

The same as Example 26, only a third extruder was used to feed a Primacor 1430 copolymer as a tie layer. The third extruder temperature was set at 170° C. and the feed ratio was controlled by setting corresponding pump speeds at 23 rpm (PEO), 12 rpm (filled LLDPE), and 5 rpm (Primacor 1430). The film thickness was about 1 mm.

Film Properties

Properties of the films made according to Examples 1 through 24 were measured and the results are shown in Table 1. Techniques for measuring these properties are described below.

Tensile Properties

A suitable technique for determining the mechanical properties of the microlayered films of the present invention can employ a Sintech tensile tester (SINTECH 1/D) and Testworks 3.03 software. The tensile tester is a device available from MTS System Co., a business having offices located in Cary, NC 27513. The software is available from MTS System Co., Sintech Division, a business having offices located in Cary, NC 27513. Equipment and software having substantially equivalent capabilities may also be employed.

Mechanical properties can be evaluated with the tensile tester using its strip-testing configuration. The testing is conducted with a 25 pound (110 N) load cell, and air actuated, rubbed coated 3 inch (7.6 cm) grips. The film testing is conducted with a 1 inch (2.54 cm) gauge length and a 5 inch/min (12.7 cm/min) crosshead speed. An individual film sample is loaded perpendicular to and in the center of the grips, and is held in place when air pressure closes the grips together. The thickness of the film is inputted by the user before beginning the tensile testing. In each experiment, the film is stretched until breakage occurs, and the equipment software or other equipment programming creates a stress-versus-strain plot and calculates the desired mechanical properties for the sample. The mechanical properties in Table 1 include Young's modulus, tensile stress at break, deformation energy at break, and % strain or elongation-at-break.

Wet Tensile Properties

To determine the wet tensile properties the individual film sample is soaked for 1 minute in tap water before the test. After a 1 minute soak the film sample is removed from water and tested according to the described above procedure. The thickness of the film sample is measured before the 1 minute soak in tap water.

Breathability

The water vapor transmission rate (WVTR) values for the film materials were calculated in accordance with ASTM Standard E96-80. Circular samples measuring three inches in diameter were cut from each of the test materials and a control of Celgard®2500 microporous film which was available from Hoechst Celanese Corporation. Individual samples of the test materials and a control material were placed across the open tops of the individual vapometer cups containing one hundred milliliters of distilled water. The screw-on flanges were tightened to form a seal along the edges of the cup. The cups were placed in a convection type oven 100° F. The relative humidity within the oven was not specifically controlled. The caps were weighed and immediately placed into oven. After 24 hours, the cups were removed from the oven and weighted again. The WVTR of each material was calculated based on the weight loss and WVTR of the control film, assuming the WVTR of the Celgard®2500 microporous film to be 5000 $g/m^2/24$ h under predetermined set conditions. A specific water-vapor transmission rate per 1 mil was calculated by multiplying a measured WVTR on the film thickness.

Hydrostatic Pressure Test

The barrier properties of the microlayer film were measured by using hydrostatic pressure test which measures the resistance of the film sample to the penetration of water under low hydrostatic pressure. The procedure used in this invention is equivalent to Method 5514 -Federal Test Methods Standard No. 191A, AATCC Test Method 127-89, and INDA Test Method 80.4-92. A film sample is mounted to form a cover on the test head reservoir. This film sample is subjected to a standardized water pressure, increased at a constant rate until leakage appears on the outer surface of the film, or water burst occurs as a result of film failure. Water pressure is measured as the hydrostatic head height reached at the first sign of leakage in three separate areas of the film sample or when burst occurs. The head height results are recorded in centimeters or millibars of water pressure on the specimen. A higher value indicates greater resistance to water penetration. For the microlayer film samples of the current invention, burst typically occurred before the leakage in three separate areas of the tested film. The TEXTEST FX-3000, Hydrostatic Head Tester available from Marlo Enterprises, Inc., was used for the hydrostatic pressure measurements.

TABLE 1

| | Units | Ex. #1 | Ex. #2 | Ex. #3 | Ex. #4 |
|---|---|---|---|---|---|
| Dry Tensile Properties | | | | | |
| Tensile Strength | Mpa | | | | |
| MD | | 54.7 | | | 27.4 |
| TD | | 14.2 | | | 9.8 |
| Elongation | % | | | | |
| MD | | 324 | | | 490 |
| TD | | 326 | | | 310 |
| Energy to Break | J/cu.cm | | | | |
| MD | | 120.5 | | | 86.8 |
| TD | | 39.4 | | | 28.4 |
| Modulus | Mpa | | | | |
| MD | | 207 | | | 95 |
| WVTR | g/sq.m/24h | 5000 | 1125 | 1560 | 1070 |
| WVTR/1 mil | g/sq.m/24h/mil | | | 2100 | 3200 |
| Hydrohead Pressure | mbar | 21 | | | |
| Wet Tensile Properties | | | | | |
| Tensile Strength | Mpa | | | | |
| MD | | 10.8 | | | 10.2 |
| TD | | 3.2 | | | 1 |
| Energy at Break | J/cu.cm | | | | |
| MD | | 22.6 | | | 26.9 |
| TD | | 6.7 | | | 0.7 |
| Modulus | Mpa | | | | |
| MD | | 10.6 | | | 13.5 |

| | Units | Ex. #5 | Ex. #6 | Ex. #7 | Ex. #8 |
|---|---|---|---|---|---|
| Dry Tensile Properties | | | | | |
| Tensile Strength | Mpa | | | | |
| MD | | 23.6 | | | 17.6 |
| TD | | 12.9 | | | 8.8 |
| Elongation | % | | | | |
| MD | | 625 | | | 518 |
| TD | | 577 | | | 450 |
| Energy to Break | J/cu.cm | | | | |
| MD | | 102 | | | 62.4 |
| TD | | 61 | | | 35 |
| Modulus | Mpa | | | | |
| MD | | 114 | | | 65 |
| WVTR | g/sq.m/24h | 720 | 200 | 225 | 640 |
| WVTR/1 mil | g/sq.m/24h/mil | 2890 | | | 2550 |
| Hydrohead Pressure | mbar | 26 | | | 30 |
| Wet Tensile Properties | | | | | |
| Tensile Strength | Mpa | | | | |
| MD | | 11.7 | | | 12.2 |
| TD | | 6.4 | | | 4.2 |
| Energy at Break | J/cu.cm | | | | |
| MD | | 27.8 | | | 44.7 |
| TD | | 21.5 | | | 12.7 |
| Modulus | Mpa | | | | |
| MD | | 34 | | | 35 |

| | Units | Ex. #9 | Ex. #10 | Ex. #11 | Ex. #12 |
|---|---|---|---|---|---|
| Dry Tensile Properties | | | | | |
| Tensile Strength | Mpa | | | | |
| MD | | 20.6 | 39.4 | 21.7 | 41.4 |
| TD | | 6.6 | 12.5 | 9 | 16.6 |
| Elongation | % | | | | |
| MD | | | | 625 | 280 |
| TD | | | | 430 | 400 |
| Energy to Break | J/cu.cm | | | | |
| MD | | 83 | 122.5 | 84 | 93 |
| TD | | 10 | 20 | 30 | 62 |
| Modulus | Mpa | | | | |
| MD | | 130 | 126 | 91 | 220 |
| WVTR | g/sq.m/24h | 70 | 1100 | 500 | 1150 |
| WVTR/1 mil | g/sq.m/24h/mil | | 3300 | 1980 | |
| Hydrohead Pressure | mbar | 35 | 15.5 | 70 | |
| Wet Tensile Properties | | | | | |
| Tensile Strength | Mpa | | | | |
| MD | | 13.9 | 9 | 15 | 18 |
| TD | | 3.1 | 1.4 | 5 | 4.4 |
| Energy at Break | J/cu.cm | | | | |
| MD | | 30 | 20 | 49 | 17 |
| TD | | 2 | 1.5 | 15.6 | 7.3 |
| Modulus | Mpa | | | | |
| MD | | 107 | 30 | 41 | 55 |

| | Units | Ex. #13 | Ex. #14 | Ex. #15 | Ex. #16 |
|---|---|---|---|---|---|
| Dry Tensile Properties | | | | | |
| Tensile Strength | Mpa | | | | |
| MD | | | 45.6 | 24 | 28.4 |
| TD | | | 9.6 | 15.3 | 14.4 |
| Elongation | % | | | | |
| MD | | | 440 | 470 | 466 |
| TD | | | 390 | 640 | 493 |
| Energy to Break | J/cu.cm | | | | |
| MD | | | 111 | 79.4 | 90 |
| TD | | | 32 | 73 | 58 |

TABLE 1-continued

| | | | | | |
|---|---|---|---|---|---|
| Modulus | Mpa | | | | |
| MD | | 158 | 176 | 122 | |
| WVTR | g/sq.m/24h | 573 | 540 | 250 | |
| WVTR/1 mil | g/sq.m/24h/mil | 1300 | | | |
| Hydrohead Pressure | mbar | 23 | 47 | 37 | |
| Wet Tensile Properties | | | | | |
| Tensile Strength | Mpa | | | | |
| MD | | 28 | 24.7 | 24.7 | |
| TD | | 4.1 | 15 | 11.6 | |
| Energy at Break | J/cu.cm | | | | |
| MD | | 47 | 88 | 83.5 | |
| TD | | 5.4 | 71 | 51 | |
| Modulus | Mpa | | | | |
| MD | | 66 | 175 | 110 | |

| | Units | Ex. #17 | Ex. #18 | Ex. #19 | Ex. #20 |
|---|---|---|---|---|---|
| Dry Tensile Properties | | | | | |
| Tensile Strength | Mpa | | | | |
| MD | | 15.1 | 53 | 71.6 | 36 |
| TD | | 11.2 | 31 | 43.1 | 24 |
| Elongation | | | | | |
| MD | | 636 | 610 | 900 | 950 |
| TD | | 260 | 690 | 1075 | 820 |
| Energy to Break | J/cu.cm | | | | |
| MD | | 90 | 198 | 347 | 207 |
| TD | | 34 | 150 | 260 | 125 |
| Modulus | Mpa | | | | |
| MD | | 230 | 241 | 236 | 171 |
| WVTR | g/sq.m/24h | 2020 | 70 | 1210 | 1080 |
| WVTR/1 mil | g/sq.m/24h/mil | | 70 | 3220 | |
| Hydrohead Pressure | mbar | | | 150 | 180 |
| Wet Tensile Properties | | | | | |
| Tensile Strength | Mpa | | | | |
| MD | | | 51 | 37.6 | 10.3 |
| TD | | | 32 | 22 | 11.5 |
| Energy at Break | J/cu.cm | | | | |
| MD | | | 185 | 162 | 157 |
| TD | | | 147 | 87 | 62 |
| Modulus | Mpa | | | | |
| MD | | | 250 | 86 | 64 |

| | Units | Ex. #21 | Ex. #22 | Ex. #23 | Ex. #24 |
|---|---|---|---|---|---|
| Dry Tensile Properties | | | | | |
| Tensile Strength | Mpa | | | | |
| MD | | 57 | | | 57 |
| TD | | 32 | | | 55 |
| Elongation | % | | | | |
| MD | | 760 | | | 860 |
| TD | | 770 | | | 770 |
| Energy to Break | J/cu.cm | | | | |
| MD | | 248 | | | 283 |
| TD | | 158 | | | 254 |
| Modulus | Mpa | | | | |
| MD | | 260 | | | 380 |
| WVTR | g/sq.m/24h | 1540 | 610 | 920 | |
| WVTR/1 mil | g/sq.m/24h/mil | 2820 | 3260 | 1800 | |
| Hydrohead Pressure | mbar | 100 | 170 | 220 | 320 |
| Wet Tensile Properties | | | | | |
| Tensile Strength | Mpa | | | | |
| MD | | | | | |
| TD | | | | | |
| Energy at Break | J/cu.cm | | | | |
| MD | | | | | |
| TD | | | | | |
| Modulus | Mpa | | | | |
| MD | | | | | |

Absorptivity

The absorptivity of sample films from Examples 25–30 was measured. Approximately 1" samples were cut from 2¼" sample tapes of the 256 layer PE/PEO microlayer films of Examples 25–30. The samples were heat sealed on all four edges with a broad-tipped tacking tool. Approximately ¼" on each edge was pressed flat and uneven edges were trimmed with scissors. Samples were punched in the center portion with the 35-needle punch and weighed (about 1–2 g each). Each sample was placed in a 2 oz bottle filled to the top with deionized water (about 60 mL). At regular intervals (2, 4, 6 and 24 hrs.) the samples were removed from the bottles, dabbed with a tissue or paper towel, and weighed. The weight for each sample was recorded and the apparent % uptake at each time was calculated as the ratio of the measured weight to the initial weight. The supernant solutions of some samples turned cloudy and it is likely that PEO and other materials were extracted from the composite. Therefore, all solutions were reserved for later analysis after removing the sample for the final time. Extracted materials may be obtained from freeze drying or rotary evaporation and analyzed. Supernant solutions of the samples from Examples 25, 28, and 27 were very cloudy, and supernant solutions of the samples from Examples 29 and 30 were also cloudy. The solution for Example 28 was relatively clear.

The microlayer films of Examples 25–30 show apparent % uptake values from approximately 50–100% by weight. The water absorption scales with the ratio of PE to PEO, with the higher absorption values for the 10/90 sample from Example 27. The presence of the EAA compatibilizer appears to arrest the swelling behavior, possibly due to enhance interlayer adhesion. Also, when samples from Examples 26 and 28 (30/70) are compared it is seen that the silicone glycol additive may have an effect on the swelling of the microlayer films. The sample from Example 28 produced a clear solution after 24 hours, whereas the sample from Example 26 produced a solution which was quite cloudy. Therefore, these data may be due to differences in PEO (or additive) extraction from the film.

TABLE 2

| Sample | A/B | A | B | C tie layer | t = 2.0 hr | Apparent Uptake (%) t = 4.0 hr | t = 6.0 hr | t = 24.0 hr |
|---|---|---|---|---|---|---|---|---|
| 25 | 50/50 | PE (CC & SG) | PEO (N80) | — | 35.9 | 42.6 | 42.2 | 78.8 |
| 26 | 30/70 | PE (CC & SG) | PEO (N80) | — | 30.7 | 42.8 | 57.8 | 95.5 |
| 27 | 10/90 | PE (CC & SG) | PEO (N80) | — | 189 | 197.8 | * | * |
| 28 | 30/70 | PE (CC) | PEO (N80) | — | 46.0 | 61.2 | 71.1 | 108.7 |
| 29 | 30/70 | PE (CC & SG) EAA 75/25 | PEO (N80) | — | 19.2 | 22.6 | 27.8 | 52.2 |
| 30 | 30/70 | PE (CC & SG) | PEO (N80) | EAA | 21.0 | 29.2 | 43.4 | 80.3 |

CC = calcium carbonate filler
SG = silicone glycol additive for filler
EAA = Primacor 1430 ethylene acrylic acid copolymer
*Sample unweighable - lost dimensional stability Properties of the Microlayer Film As demonstrated by the data in Table 1, the water-responsive microlayered film, in its various aspects, can exhibit improved combination of the film properties in a dry state such as modulus, film tensile strength, film elongation-to-break, film energy-to-break, as well as desired levels of breathability and wettability. The microlayer fim is also water absorptive as illustrated in Examples 25–30 and the data in Table 2. In other aspects, the microlayered film can provide material with reduced rate of penetration of liquid water and improved barrier property. In still other aspects of the invention, the microlayered film can provide material with modified crystallinity which can be useful for some functional applications of the film, and can provide films with improved tensile properties and modified electrochemical behavior.

According to further aspects, the water-responsive microlayered film of the invention can provide material which degrades in water (when immersed in large amount of water), and provides reduced tensile properties such as modulus, tensile strength, and energy-to-break in a wet state.

According to particular aspects of the invention, the microlayer film in a dry state can have tensile strength in a first, machine direction (MD) of not less than about 5 Mega-Pascal (5 MPa). Alternatively, the tensile strength is at least about 10 MPa, and optionally is at least about 15 MPa. According to other aspects, the method and apparatus of the invention can provide a microporous film tensile strength in the MD not more than about 300 MPa. Alternatively, the MD film tensile strength does not exceed about 100 MPa, and optionally does not exceed about 60 MPa to provide improved performance and processibility during subsequent manufacturing operations. Typically, the machine direction of the film is the direction along which the film is moved during manufacture or processing.

According to other aspects of the invention, the dry tensile strength of the microlayer film in a second, transverse direction (TD) is at least about 5 MPa. Alternatively, the TD tensile strength is at least about 8 MPa, and optionally is at least about 12 MPa. According to yet other aspects, the microporous film can have TD strength of not more than about 300 MPa. Alternatively, the TD film strength can be not higher than 100 MPa, and optionally can be not more than 50 MPa.

According to further aspects, the microlayer film can exhibit a percent elongation-at-break in machine direction of at least about 30%, as determined by the formula: 100 $(L_f-L_i)/L_i$; where $L_f$ is the final length of a film sample at break, and $L_i$ is the initial length of the film sample prior to elongation. Alternatively, the elongation-at-break is at least 100%, and optionally is at least about 150%. According to still other aspects, the microporous film can have MD elongation-at-break of not more than about 1500%. Alternatively, the MD elongation-at-break does not exceed about 1000%, and optionally, does not exceed about 600%.

According to other aspects of the invention, the microlayer film has an elongation-at-break in the transverse direction which is at least about 30%, and desirably is at least about 50%. Alternatively, the TD elongation-at-break is at least about 100%, and optionally is at least about 150%. In other aspects, the microporous film can have an elongation-at-break, in the TD, of not more than about 1500%. Alternatively, the TD elongation-at-break does not exceed about 1000%, and optionally does not exceed about 600%.

According to additional aspects, the microlayer film of the invention can advantageously provide an enhanced WVTR value. The breathability of the microlayer film of this invention is demonstrated by its WVTR value. In particular aspects of the invention, the WVTR of the microlayer film is at least about 300 g/m$^2$/24 hr./mil (grams per square meter, per 24 hours, per 0.001 inch of film thickness). Optionally, the WVTR is at least about 800 g/m$^2$/24 hr./mil. In other aspects, the WVTR does not exceed about 50,000 g/m$^2$/24 hr./mil. Alternatively, the WVTR value does not exceed about 25,000 g/m$^2$/24 hr./mil, and optionally, does not exceed about 10,000 g/m$^2$/24 hr./mil.

According to still further aspects of the invention, the wet tensile strength of the microlayer film of this invention, after a 1 minute soak in water, can be not more than about 40 Mpa, alternatively, it can be not more than about 15 Mpa, and optionally, not more than about 10 Mpa.

According to yet other aspects of the invention, the microlayer film in a wet state can exhibit tensile energy to break per unit volume of material, as determined by the area understress-strain curve divided on product of cross sectional area of the film and a gauge length, not more than 200 J/cu. cm. alternatively, it can be not more than about 50 J/cu. cm., and optionally not more than about 20 J/cu. cm.

According to still another aspect, the water degradable microlayer film of this invention in a wet state can exhibit a reduced modulus which can facilitate flushing of the film. The tensile modulus of the water degradable microlayer film after a 1 minute soak in water does not exceed about 100 Mpa, desirably does not exceed about 50 Mpa, and preferably does not exceed about 25 Mpa.

In further aspects, the water-degradable microlayered film of the present invention can provide material with reduced rate of penetration of a small amount of water and advantageously can provide water-responsive film with enhanced barrier. The barrier property of the microlayer film of this invention is demonstrated by its hydrostatic pressure to burst, also known as burst strength, measured according to the hydrostatic head test method. The hydrostatic pressure to burst is at least about 1 mbar, alternatively it is at least about 10 mbar, and optionally, it is at least about 20 mbar to provide a desired performance.

The dry strength of the microlayer film can be controlled by the relative amounts of water degradable and non-water degradable polymers in the film and the thickness and number of microlayers in the film. The strength of the microlayer film is greater with a greater amount of non-water degradable polymer in the film. The microlayer film has a lower tensile energy at break after soaking in water when the concentration of water degradable polymer in the film is higher and when the number of overall microlayers in the film is greater. Increasing the amount of particulate filler and surfactant in the non-water degradable layers of the film improves water access into the microlayer film, reduces the wet strength of the film, and facilitates disintegration of the film in water. Post treatment of the microlayer film such as uniaxial or biaxial stretching further reduces the wet tensile properties of the film as a result of improved water access into the film structure.

The barrier property of the microlayer film of this invention can be controlled by the relative amount of non-water degradable polymer in the film and the number of microlayers in the film. Increasing the relative amount of non-water degradable polymer in the film increases the barrier property of the film.

The water vapor transmission rate or breathability of the microlayer film can be controlled by the relative amount of water degradable polymer in the film, the amount of particulate filler and surfactant in the non-water degradable layers, and the number of microlayers in the film. Increasing the water degradable polymer content, the filler content, the surfactant content, or the number of layers enhances the breathability of the film. Stretching of the film also increases the breathability of the film.

A preferred microlayer film includes water degradable layers comprising PEO and non-water degradable layers comprising LLDPE filled with a particulate filler material such as calcium carbonate coated with silicone glycol surfactant. Such a microlayer film is breathable, tough, tear resistant, flexible, soft, a barrier to small amounts of liquids and other aqueous liquids, and is strong when dry, but disintegrates when soaked in water.

Another preferred microlayer film includes water degradable layers comprising PEO and non-water degradable layers comprising polycaprolactone. A microlayer film comprising PEO and polycaprolactone provides a film with controlled functional characteristics such as strength, toughness, tear resistance, softness and flexibility, barrier to water and other aqueous liquids, breathability, microbial barrier, biodegradability, and degradability in water. The PEO/PCL microlayer film with alternating layers of PEO and PCL demonstrates high elongation at break, high strength, and reduced modulus compared to the tensile properties of films made solely out of either PEO or PCL. The PEO/PCL microlayer film is breathable without stretching and demonstrates high barrier property which makes it desirable for applications in personal care products. In addition, the film is water degradable in that when soaked in water, the tensile strength and toughness of the film drops substantially. Accordingly, the disclosed PEO/PCL microlayer film is especially useful for flushable application such as flushable diapers, feminine care items, panty liners, training pants, as well as for other advanced personal care and health care products. The PCL layers of the PEO/PCL microlayer film are biodegradable and thereby enhance the disposability of the film.

The combination of PEO and PCL in the microlayer film is synergistic. For example, the PEO/PCL microlayer film has a modulus below a weighted average of the modulus of films made solely of either PCL or PEO. Reduced modulus results in a softer and less noisy film which is desirable for personal care products. At the same time, the PEO/PCL microlayer film has tensile properties such as percent strain at break and break stress which are higher than the weighted averages of such properties for films made solely of PEO or PCL. In addition, the PEO/PCL microlayer film exhibits high strength and high elongation at break.

After soaking in water for one minute, the tensile properties of the PEO/PCL microlayer film drop substantially. Strength, wet tensile energy at break, and modulus for the PEO/PCL microlayer film drops substantially after soaking the film in water. This indicates a strong water sensitivity which is useful for flushable applications.

The PEO/PCL microlayer film is breathable as evidenced by a relatively high WVTR rate. The PEO/PCL microlayer film has a WVTR in the range of about 3000 g/sg.m/day/mil. This breathability can be achieved without stretching or the addition of filler. Stretching the film and adding filler, however, can enhance the breathability of the film.

The PEO/PCL microlayer film has enhanced burst strength as shown by the hydrostatic head test. The PEO/PCL microlayer film exhibits high barrier with high PCL content or high PEO content.

As explained above, the microlayer film of this invention, when dry, has relatively high strength and toughness, is a barrier to small amounts to water or other aqueous liquids, and is breathable without stretching, but when soaked in water degrades or even disintegrates for easy disposal such as by flushing. The microlayer film of this invention can be laminated to a nonwoven web. Accordingly, the microlayer film of this invention is suitable for applications such as cover materials for absorbent personal care items including diapers, adult incontinence products, feminine care absorbent products, training pants, and wound dressings. The microlayer film of this invention can also be used to make surgical drapes and surgical gowns and other disposable garments. In addition to the foregoing properties, the microlayer film of this invention is also ductile, soft and durable when dry or only partially wetted.

FIG. 3 illustrates a disposable diaper 100 made according an embodiment of this invention. The diaper 100 includes a front waistband panel section 112, a rear waistband panel section 114, and an intermediate section 116 which interconnects the front and rear waistband sections. The diaper 100 comprises an outer cover layer 120 which is a water degradable microlayer polymer film described above, a liquid permeable liner layer 130, and an absorbent body 140 located between the outer cover layer and the liner layer. Fastening means, such as adhesive tapes 136 are employed to secure the diaper 100 on the wearer. The liner 130 and the outer cover 120 are bonded to each other and to the absorbent body with lines and patterns of adhesive, such as a hot melt, pressure-sensitive adhesive. Elastic members 160, 162, 164, and 166 can be configured about the edges of the diaper for a close fit about the wearer.

The liner layer 130 presents a body-facing surface which is compliant to the wearer's skin. A suitable liner may be manufactured from a wide selection of web materials, such as porous foams, reticulated foams, apertured plastic films, natural fibers (for example, wood or cotton fibers), synthetic fibers (for example, polypropylene or polyester fibers), or a combination of natural and synthetic fibers. Various woven and nonwoven fabrics can be used for liner. For example, the liner may be composed of a meltblown or spunbonded web of polyolefin fibers. The liner 130 may be composed of a hydrophobic material, and the hydrophobic material may be treated with a surfactant or otherwise processed to impart desired level of wettability and hydrophilicity. In particular, liner 130 can be a spunbond polypropylene fabric which is surface treated with Triton X-102 surfactant.

The absorbent body 140 can comprise a matrix of substantially hydrophilic fibers having therein a distribution of high-absorbency material, such as particles of superabsorbent polymer. Examples of suitable fibers include organic fibers, such as cellulosic fibers; synthetic fibers made from wettable thermoplastic polymers such as polyester or polyamide; and synthetic fibers composed of nonwettable polymer, such as polypropylene fibers, which have been hydrophilized by appropriate treatment.

The high absorbency material of the absorbent body 140 may comprise absorbent gelling materials, such as superabsorbents. Examples of synthetic absorbing gelling material include the alkali metal and ammonium salts of poly(acrylic acid) and poly(methacrylic acid), poly(acrylamides) and poly(vinyl ethers).

The outercover material 120 may optionally be composed of breathable material which permits vapors to escape from absorbent structure while still preventing liquid exudates from passing through the outercover. For example, the breathable outercover 120 may be composed of a breathable microlayer film of the current invention which can be optionally laminated with a nonwoven fabric. Examples of suitable fibers for the nonwoven fabric include organic fibers, such as cellulosic fibers; synthetic fibers made from thermoplastic polymers such as polyester or polyamide; and synthetic fibers composed of thermoplastic polymer, such as polypropylene fibers. The nonwoven fabric can be optionally coated or otherwise treated to impart desired level of liquid impermeability. Optionally, the microlayer film of the current invention can also be modified or otherwise treated to enhance its barrier property to the level desirable for in-use performance. To enhance barrier property of the microlayer film of the invention, a thin additional barrier layer can be coated or coextruded with the microlayer film.

The outercover material 120 can also be embossed or otherwise be provided with a matte finish to exhibit a more aesthetically pleasing appearance.

Although the absorbent article 100 shown in FIG. 3 is a disposable diaper, it should be understood that the microlayer film of this invention can be used to make a variety of absorbent articles such as those identified above.

While the invention has been described in detail with respect to specific embodiments thereof, it will be appreciated that those skilled in the art, upon attaining an understanding of the foregoing, will readily conceive of alterations to variations of and equivalents to these embodiments. Accordingly, the scope of the present invention should be assessed as that of the appended claims and any equivalence thereto.

We claim:

1. A microlayer polymer film comprising a plurality of coextruded microlayers including a plurality of non-degradable microlayers comprising a non-water degradable, melt-extrudable polymer and a plurality of degradable microlayers comprising a water degradable melt-extrudable polymer, wherein the non-water degradable polymer is characterized such that a first sample film of the non-water degradable polymer has a wet tensile strength and a dry tensile strength, the wet tensile strength of the first sample film being substantially the same as the dry tensile strength of the first sample film, and the water degradable polymer is characterized such that a second sample film of the water degradable polymer has a wet tensile strength and a dry tensile strength, the wet tensile strength of the second sample film being substantially less than the dry tensile strength of the second sample film.

2. A microlayer polymer film as in claim 1 wherein the microlayer polymer film disintegrates in water.

3. A microlayer polymer film as in claim 2 wherein the microlayer polymer film has a wet tensile energy at break not more than 200 J/cm$^3$ in the machine direction after the microlayer polymer film has been soaked in water for 1 minute.

4. A microlayer polymer film as in claim 3 wherein the microlayer polymer film has a dry tensile strength of at least 5 MPa in the machine direction.

5. A microlayer polymer film as in claim 1 wherein the microlayer polymer film has a hydrostatic burst strength of no less than 1 mbar.

6. A microlayer polymer film as in claim 2 wherein the microlayer polymer film has a wet tensile energy at break not more than 200 J/cm$^3$ in the machine direction after the microlayer polymer film has been soaked in water for 1 minute, a dry tensile energy at break of at least 5 MPa in the machine direction, and has a hydrostatic burst strength of no less than 1 mbar.

7. A microlayer polymer film as in claim 1 wherein the water degradable polymer is polyethylene oxide.

8. A microlayer polymer film as in claim 7 wherein the non-water degradable polymer is a polyolefin.

9. A microlayer polymer film as in claim 8 wherein the polyolefin is linear low density polyethylene.

10. A microlayer polymer film as in claim 7 wherein the non-water degradable polymer is polycaprolactone.

11. A microlayer polymer film as in claim 1 wherein the non-degradable microlayers further comprise a particulate filler dispersed in the non water degradable polymer.

12. A microlayer polymer film as in claim 11 wherein the particulate filler has a particle size within a range from about 0.1 to about 50 microns.

13. A microlayer polymer film as in claim 11 wherein the particulate filler has a particle size within a range from about 0.1 to about 20 microns.

14. A microlayer polymer film comprising a plurality of coextruded microlayers including a plurality of non-degradable microlayers comprising a non-water degradable melt-extrudable polymer and a plurality of degradable microlayers comprising a water degradable melt-extrudable polymer, wherein the non-degradable microlayers further comprise a particulate filler dispersed in the non water degradable polymer, the particulate filler material has a surface and the non-degradable layer includes a surfactant on the surface of the particulate filler material for enhancing the hydrophilicity of the particulate filler material.

15. A microlayer polymer film as in claim 1 having a thickness from about 5 microns to about 1 mm.

16. A microlayer polymer film as in claim 1 having a thickness from about 10 microns to about 125 microns.

17. A microlayer polymer film as in claim 1 having a thickness from about 25 microns to about 75 microns.

18. A microlayer polymer film as in claim 1 wherein the microlayers have a thickness from about 10 angstroms to about 150 microns.

19. A microlayer polymer film as in claim 1 wherein the microlayers are 8 to 17,000 in number.

20. A microlayer polymer film as in claim 1 wherein the microlayers are 60 to 4000 in number.

21. A microlayer polymer film as in claim 1 wherein the microlayers are 120 to 1000 in number.

22. A microlayer polymer film as in claim 1 wherein the microlayers are 4000 to 17,000 in number.

23. A microlayer polymer film as in claim 1 wherein the microlayers have a thickness from about 10 angstroms to about 150 microns and the microlayers are 60 to 4000 in number.

24. A microlayer polymer film as in claim 14 wherein the microlayers have a thickness from about 10 angstroms to about 150 microns.

25. A microlayer polymer film as in claim 14 wherein the degradable and non-degradable microlayers total 8 to 17,000 in number.

26. A microlayer polymer film as in claim 14 wherein the degradable and non-degradable microlayers total 60 to 4000 in number.

27. A microlayer polymer film as in claim 14 wherein the degradable and non-degradable microlayers total 120 to 1000 in number.

28. A microlayer polymer film as in claim 14 wherein the degradable and non-degradable microlayers total 4000 to 17,000 in number.

29. A microlayer polymer film as in claim 14 wherein the microlayers have a thickness from about 10 angstroms to about 150 microns and the degradable and non-degradable microlayers total 60 to 4000 in number.

30. A microlayer polymer film as in claim 1 wherein each laminate unit further comprises a tie layer between and laminated to the non-degradable layer and the degradable layer, the tie layer comprising a melt-extrudable polymer.

31. A microlayer polymer film as in claim 30 wherein the tie layer comprises a polymer selected from the group consisting of ethylene acrylic acid copolymers, thermoplastic polyesters, polyalkane-poly(ethylene oxide) block copolymers, and poly(vinyl alcohol) block copolymers.

32. A microlayer polymer film as in claim 1 wherein the non-water degradable polymer is present in a amount from about 3 to about 95% by weight of the film and the water degradable polymer is present in a amount from about 97 to about 5% by weight of the film.

33. A microlayer polymer film comprising a plurality of coextruded microlayers including a plurality of non-degradable microlayers comprising a non-water degradable melt-extrudable polymer and a plurality of degradable microlayers comprising a water degradable melt-extrudable polymer, wherein the non-degradable microlayers further comprise a particulate filler dispersed in the non water degradable polymer, the non-water degradable polymer is present in a amount from about 3 to about 95% by weight of the film, the water degradable polymer is present in a amount from about 97 to about 5% by weight of the film, and the particulate filler is present in an amount from about 0.5 to about 70% by weight of the film.

34. A personal care item comprising a body of absorbent material and a microlayer polymer film as in claim 14 attached to the body of absorbent material.

35. A personal care item as in claim 34 wherein the personal care item is a diaper.

36. A personal care item as in claim 34 wherein the personal care item is an adult incontinence product.

37. A personal care item as in claim 34 wherein the personal care item is a feminine care absorbent product.

38. A personal care item as in claim 34 wherein the personal care item is a training pant.

39. A wound dressing comprising a body of absorbent material and a microlayer polymer film as in claim 1 attached to the body of absorbent material.

40. A disposable garment comprising a microlayer polymer film as in claim 1.

41. The microlayer polymer of claim 1, wherein the film has a water vapor transmission rate of at least 300 $g/m^2/day/mil$.

* * * * *

UNITED STATES PATENT AND TRADEMARK OFFICE
CERTIFICATE OF CORRECTION

PATENT NO.    : 6,117,438
DATED         : September 12, 2000
INVENTOR(S)   : Vasily Topolkaraev, Dave A. Soerens and Kelly Dean Branham It is certified that error appears in the above-identified patent and that said Letters Patent is hereby corrected as shown below:

<u>Title page,</u>
Item [56], References Cited, U.S. PATENT DOCUMENTS,
Below "4,874,568", insert -- 5,147,696 9/1992 Lansbury et al. 428/36.4 --.

Below "5,269,995" insert -- FOREIGN PATENT DOCUMENTS --.
Below "FOREIGN PATENT DOCUMENTS" insert -- 96/20831 7/1996 WO --.
Below "96/20831" insert -- 96/15903 5/1996 WO --.
Below "96/15903" insert -- GB 2 187 674 9/1987 United Kingdom --.
Below "GB 2 187 674" insert -- 92/15454 9/1992 WO --.

<u>Column 6,</u>
Line 55, delete "I" and substitute -- 1 --.

<u>Column 9,</u>
Line 25, delete "Gurneen" and substitute -- Gurnee --.
Line 44, delete "activate" and substitute -- active --.

<u>Column 18,</u>
Line 33, delete "a".

<u>Column 19,</u>
Lines 6 and 33, delete "a".

<u>Column 20,</u>
Line 67, delete "PCLL" and substitute -- PCL --.

<u>Column 21,</u>
Line 3, delete "mi" and substitute -- mil --.
Line 10, delete "sued" and substitute -- used --.

<u>Column 22,</u>
Line 37, delete "weighted" and substitute -- weighed --.

<u>Column 25,</u>
Table 1-continued, MD TD Elongation, Units, line 32, insert -- % --.

UNITED STATES PATENT AND TRADEMARK OFFICE
CERTIFICATE OF CORRECTION

PATENT NO.    : 6,117,438
DATED         : September 12, 2000
INVENTOR(S)   : Vasily Topolkaraev, Dave A. Soerens and Kelly Dean Branham It is certified that error appears in the above-identified patent and that said Letters Patent is hereby corrected as shown below:

Column 27,
Line 35, delete "fim" and substitute -- film --.

Column 30,
Line 27, delete the second occurrence of "to" and substitute -- of --.

Column 33,
Line 34, delete "a" and substitute -- an --.

Column 34,
Lines 1, 11 and 12, delete "a" and substitute -- an --.
Line 17, delete "14" and substitute -- 1 --.

Signed and Sealed this

Tenth Day of June, 2003

JAMES E. ROGAN
*Director of the United States Patent and Trademark Office*